(12) United States Patent
Reber

(10) Patent No.: US 8,543,467 B2
(45) Date of Patent: *Sep. 24, 2013

(54) WIRELESS COMMUNICATION DEVICE AND METHOD FOR USE THEREWITH

(75) Inventor: William L. Reber, Tustin, CA (US)

(73) Assignee: Rakuten, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/470,685

(22) Filed: May 14, 2012

(65) Prior Publication Data

US 2012/0239533 A1    Sep. 20, 2012

Related U.S. Application Data

(63) Continuation of application No. 12/553,425, filed on Sep. 3, 2009, now Pat. No. 8,200,542, which is a continuation of application No. 09/698,310, filed on Oct. 27, 2000, now Pat. No. 7,890,386, which is a continuation-in-part of application No. 09/638,815, filed on Aug. 14, 2000, now abandoned, and a continuation-in-part of application No. 09/638,470, filed on Aug. 14, 2000, now abandoned, and a continuation-in-part of application No. 09/641,207, filed on Aug. 18, 2000, now abandoned.

(51) Int. Cl.
   *G06Q 40/00* (2012.01)

(52) U.S. Cl.
   USPC ........................... 705/26.1; 705/27.1

(58) Field of Classification Search
   USPC .......................... 705/26.1, 27.1, 5
   See application file for complete search history.

(56) References Cited

U.S. PATENT DOCUMENTS

| | | | |
|---|---|---|---|
| 5,546,475 A * | 8/1996 | Bolle et al. | 382/190 |
| 5,870,149 A * | 2/1999 | Comroe et al. | 348/474 |
| 6,157,435 A | 12/2000 | Slater et al. | |
| 6,216,227 B1 | 4/2001 | Goldstein et al. | |
| 6,483,570 B1 | 11/2002 | Slater et al. | |
| 6,484,130 B2 | 11/2002 | Dwyer et al. | |
| 6,512,919 B2 * | 1/2003 | Ogasawara | 455/422.1 |
| 6,530,521 B1 * | 3/2003 | Henry | 235/383 |
| 6,549,913 B1 | 4/2003 | Murakawa | |
| 6,947,571 B1 * | 9/2005 | Rhoads et al. | 382/100 |
| 2003/0208409 A1 | 11/2003 | Mault | |

OTHER PUBLICATIONS

"Polaroid and Visionics Team up to Provide Facial Recognition Solutions for Departments of Motor Vehicles". PR Newswire. New York: Apr 15, 1998. p. 1.*

Richard, Donald R. "10 technology faces the future". Security Management. Arlington: Apr. 1994. vol. 38, Iss. 4: p. 57, 4pgs.*

"Automated Facial Recognition Technology and Services". Federal Commerce Business Daily. Washington: Jun. 20, 2000. p. 1.*

* cited by examiner

*Primary Examiner* — Hani M Kazimi
(74) *Attorney, Agent, or Firm* — Sughrue Mion, PLLC

(57) ABSTRACT

An image of at least one object (14) is captured. An object class selection is received from a menu (70) of a plurality of object classes. At least one task menu specific to the object class selection is provided. A task selection is received from the at least one task menu. A task associated with the at least one object (14) is facilitated based on the image and the task selection.

17 Claims, 8 Drawing Sheets

WIRELESS COMMUNICATION DEVICE AND METHOD FOR USE THEREWITH

RELATED APPLICATIONS

The present invention claims priority under 35 U.S.C. 120 as a continuation of, "WIRELESS COMMUNICATION DEVICE AND METHODS FOR USE THEREWITH," filed Sep. 3, 2009, having Ser. No. 12/553,425.

Ser. No. 12/553,425 claims priority under 35 U.S.C. 120 as a continuation of, "METHOD AND SYSTEM FOR FACILITATING TASKS USING IMAGES AND SELECTIONS FROM OBJECT CLASS AND TASK MENUS," filed Oct. 27, 2000, having Ser. No. 09/698,310.

Ser. No. 09/698,310 claims priority under 35 U.S.C. 120 as a continuation-in-part of the application entitled "ONLINE BIDDING METHODS AND SYSTEMS FOR AGGREGATE ORDERS", filed Aug. 14, 2000, having Ser. No. 09/638,815, abandoned.

Ser. No. 09/698,310 claims priority under 35 U.S.C. 120 as a continuation-in-part of the application entitled "METHODS AND SYSTEMS FOR FACILITATING FULFILLMENT OF AN AGGREGATE ORDER AT MULTIPLE RETAIL STORES", filed Aug. 14, 2000, having Ser. No. 09/638,470, abandoned.

Ser. No. 09/698,310 claims priority under 35 U.S.C. 120 as a continuation-in-part of the application entitled "COMPUTER NETWORK NAVIGATION USING OBJECTS ABSENT OF OPTICAL CODES", filed Aug. 18, 2000, having Ser. No. 09/641,207 abandoned.

The entire disclosures of the above-identified applications are hereby incorporated by reference into the disclosure of the present application.

TECHNICAL FIELD

The present invention relates to wireless communication devices that include image capture devices.

BACKGROUND OF THE INVENTION

Two commonly-used techniques for navigating to destinations of a computer network, such as the Internet, include: (a) manually entering a Uniform Resource Locator (URL) into a command line of a Web browser, and (b) clicking on a hyperlink displayed by a Web browser. Manually entering URLs having a long sequence of characters may be undesirable for some end users.

Various recently-proposed techniques for navigating to destinations of the Internet use bar codes to obviate manual entering of URLs. U.S. Pat. Nos. 5,930,767, 5,938,726, 5,940,595, 5,969,324, 5,986,651, 5,995,105, 6,032,195 and 6,081,827, which are assigned to Motorola, Inc. and are hereby incorporated by reference into the present disclosure, disclose various approaches to computer network navigation using bar codes.

U.S. Pat. No. 5,978,773 to Hudetz et al. discloses that a bar code used to identify a product (e.g. a Universal Product Code) also may be used to access remote computers on a network. To access an Internet resource relating to a particular product, a user enters the product's UPC. A database retrieves the URL (Uniform Resource Locator) corresponding to the UPC. The URL is used to access the Internet resource.

U.S. Pat. No. 5,804,803 to Cragun et al. discloses a method which includes determining whether or not a code is a UPC. If the code is a UPC, URL information stored in a product database is requested using the UPC as an index. If the code is not a UPC, the code is considered as a URL string which may or may not be in an abbreviated form.

International Publication No. WO 00/16211 to Digitalconvergence.com, Inc. discloses a method for interfacing scanned product information with the manufacturer of the product over a global communication network. A product identifier is accessed at a source location on the network. Routing information is appended to the accessed product identifier. The routing information defines a remote location on the network. The product information is transmitted from the source location to the remote location in accordance with the appended routing information.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF PREFERRED EMBODIMENTS

Figure 1:
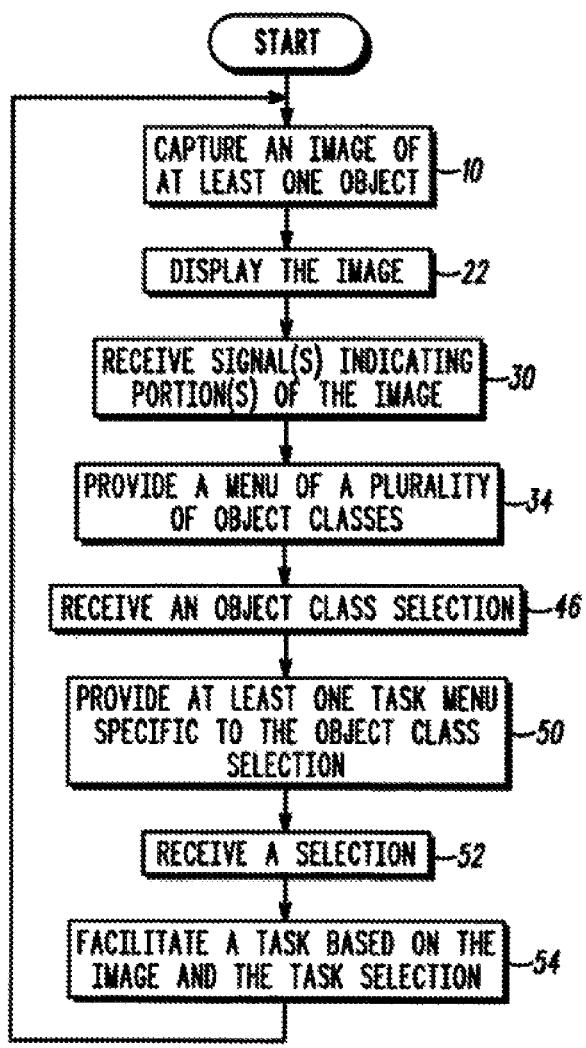
FIG. 1 is a flow chart of an embodiment of a method of facilitating tasks using images and selections from object class and task menus.
Figure 2:
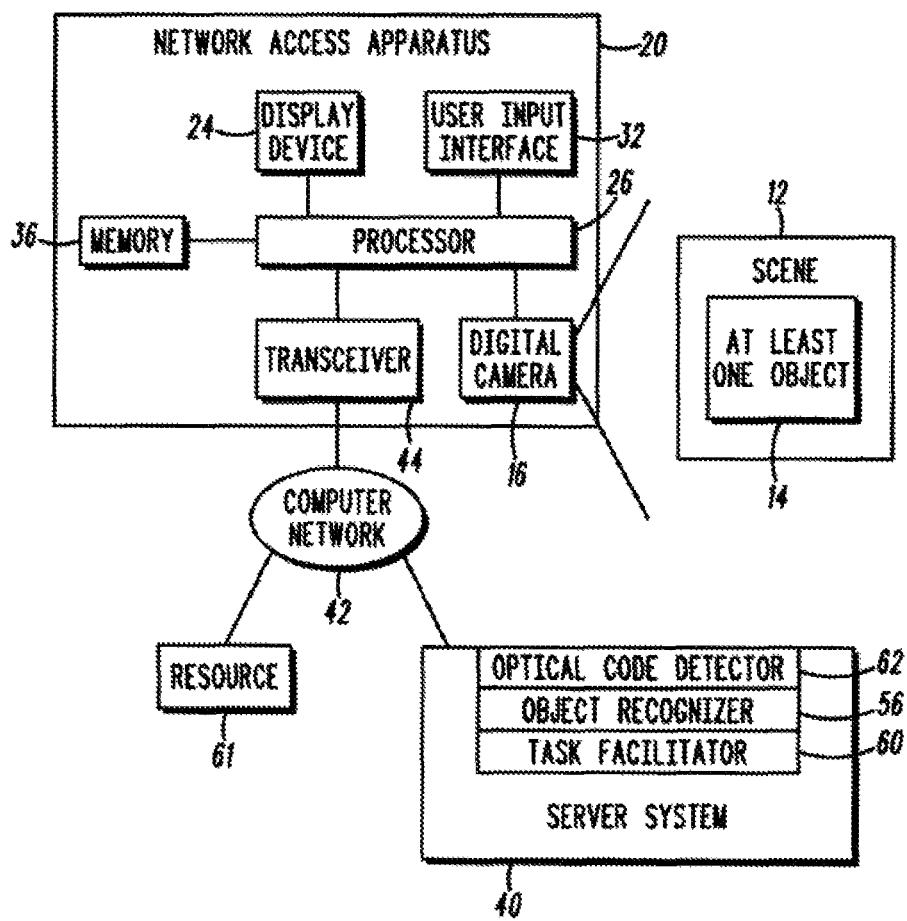
FIG. 2 is a block diagram of an embodiment of a system for facilitating tasks using images and selections from object class and task menus.

There is a need for methods and systems which do not require an optical code, such as bar code, to be present on an object in order to optically use the object to facilitate a task. To meet this need and other needs, embodiments of methods and systems for facilitating tasks using images and selections from object class and task menus are disclosed herein. Embodiments are described with reference to FIG. 1, which shows a flow chart of an embodiment of a method of facilitating tasks using images and selections from object class and task menus, and FIG. 2, which shows a block diagram of an embodiment of a system for facilitating tasks using images and selections from object class and task menus.

As indicated by block 10, the method comprises capturing an image of a scene 12 which comprises at least one object 14. An end user may capture the image using a digital camera 16 associated with a network access apparatus 20. The digital camera 16 may comprise various image capturing devices known in the art, such as a charge-coupled device (CCD) array or complementary metal-oxide semiconductor (CMOS) sensors, for example. The digital camera 16 may include a single CCD array to capture a two-dimensional image of the scene 12. Alternatively, the digital camera 16 may include two CCD arrays to capture a 3-D stereoscopic image of the scene 12. The image may be a still image or one of an animated sequence of images.

The network access apparatus 20 may have various implementations. Absent the digital camera 16, examples of the network access apparatus 20 include, but are not limited to, a computer, a personal digital assistant, a set-top box, a Web telephone, a two-way pager, a game player, various wireless network access apparatus, a wireless wrist communication device, a pen-shaped wireless communication device and a card-shaped wireless communication device. The digital camera 16 may be either integrated with, attached to, or otherwise in communication with (e.g. via a memory card) any of the aforementioned apparatus. Of particular interest is the network access apparatus 20 comprising a Web-enabled, wireless handheld device, such as a Web-enabled cellular telephone, having an integrated digital camera.

As indicated by block 22, the method optionally comprises displaying the image for view by the end user. The image is displayed by a display device 24 responsive to the digital camera 16 via a processor 26. Preferably, the display device 24 comprises a liquid crystal display having a pixel resolution, a number of pixel intensity levels and/or a number of pixel colors sufficient for displaying the image. Alternatively, other display devices, such as a cathode ray tube, a computer monitor, a television, a field emission display, a display on a wireless telephone, a display on a wireless wrist communication device, a display on a pen-shaped wireless communication device, and a display on a card-shaped wireless communication device may be employed as one having ordinary skill in the art will recognize.

The processor 26 either directs or assists in directing acts performed by various components of the network access apparatus 20. The processor 26 may comprise one or more microprocessors, one or more microcontrollers, or other implementations of a logic circuit. The processor 26 may be directed by computer-readable content of a computer-readable medium. Examples of the computer-readable medium include a computer-readable storage medium and a computer-readable communication medium. Examples of computer-readable storage media include, but are not limited to, a computer memory, a solid state memory card, a flash memory, a magnetic floppy disk, a magnetic hard disk, and an optical disk. Examples of computer-readable communication media include, but are not limited to, an electronic medium, an optical medium and an electromagnetic medium.

As indicated by block 30, the method optionally comprises receiving one or more signals indicating one or more user-selected portions of the image. The end user selects the portion(s) of the image to contain one or more of the at least one object 14, and to exclude at least another one of the at least one object 14. The one or more of the at least one object 14 in the user-selected portion(s) include those for which the user desires to perform an associated task.

To provide the aforementioned signal(s), the network access apparatus 20 comprises a user input interface 32. The user input interface 32 senses one or more user-initiated actions which indicate the user-selected portion(s) of the image, and generates the signal(s) based thereon. Preferably, the user input interface 32 comprises a touch-sensitive screen of the display device 24. In this case, the end user may use a stylus or a finger to draw one or more closed loops around one or more of the at least one object 14 to make a selection thereof. Either in addition to or as an alternative to the touch-sensitive screen, the user input interface 32 may comprise any combination of a telephone keypad, one or more buttons, a mouse, a trackball, a pointing stick, a touch pad, a joystick, a keyboard, and a voice input device. The end user may select the portion(s) of the image using any of the aforementioned input devices. Using a voice input device, for example, a user may speak a name and/or a description of the at least one object 14 to make a selection thereof.

As indicated by block 34, the method comprises providing a menu of a plurality of object classes. The plurality of object classes in the menu may comprise a person class, a product class, a company class, a location class, an event class, or any combination thereof. The menu may be provided locally by a memory 36 and/or remotely by a server system 40 via a computer network 42. The menu is displayed by the display device 24.

If the menu is provided remotely, a transceiver 44 may be directed by the processor 26 to facilitate navigation to the server system 40 via the computer network 42. Thereafter, the transceiver 44 may be directed by the processor 26 to receive the menu from the server system 40 via the computer network 42. Examples of the transceiver 44 include, but are not limited to, a wireless radio frequency transceiver, a wireless modem, a dial-up modem, a cable modem and a network interface card. Examples of the computer network 42 include, but are not limited to, an internet, an intranet and an extranet.

As indicated by block 46, the method comprises receiving an object class selection from the menu. The object class selection is made by the end user using the user input interface 32.

As indicated by block 50, the method comprises providing at least one task menu specific to the object class selection. Each task menu provides a plurality of tasks specific to a class of objects. Specific examples of task menus are subsequently described with reference to FIG. 3. The at least one task menu may be provided locally by the memory 36 and/or remotely by the server system 40 via the computer network 42. The at least one task menu is displayed by the display device 24.

As indicated by block 52, the method comprises receiving a task selection from the at least one task menu. The task selection is made by the end user using the user input interface 32.

As indicated by block 54, the method comprises facilitating a task associated with the at least one object 14 based on the image and the task selection. The image and the task selection may be processed remotely by the server system 40 to facilitate the task. In this case, the transceiver 44 is used to communicate the task selection and at least part of the image to the server system 40 via the computer network 42. The at least part of the image may consist of either the entire image or the user-selected portion(s) of the image. Optionally, the entire image is provided to the server system 40 along with data indicating the user-selected portion(s).

The server system 40 provides an object recognizer 56 capable of recognizing objects absent of an optical code in a received image. Preferably, the object recognizer 56 is capable of recognizing objects absent of an optical code and objects having an optical code which is not present in the received image. For example, the object recognizer 56 may be capable of recognizing objects absent of either a one-dimensional or a two-dimensional bar code, and objects having either a one-dimensional or a two-dimensional bar code which is not present in the received image. Various known object recognition methodologies may be employed by the object recognizer 56, as those having ordinary skill in the art of image processing will recognize.

Preferably, the object recognizer 56 is capable of recognizing both substantially planar objects and substantially non-planar objects. Examples of substantially planar objects include, but are not limited to, fingerprints, a printed page in a publication, a printed poster, and a printed sign. Examples of substantially non-planar objects include, but are not limited to, human faces, products in visually recognizable packages and/or containers (e.g. cans, bottles, boxes and bags), visually-recognizable products themselves, landmarks and buildings.

It is further preferred that the object recognizer 56 be capable of recognizing objects independent of their absolute and relative locations in the received image. Further, the object recognizer 56 preferably is capable of recognizing objects independent of their orientation and/or size in the received image.

The object recognizer 56 may use a user-spoken or otherwise user-entered name and/or description of an object to assist in its recognition and/or selection. For example, the end user may say "battery" to select a battery within an image of a plurality of objects. The object recognizer 56, in turn, would attempt to recognize a battery within the image.

The server system 40 further provides a task facilitator 60 responsive to the object recognizer 56. The task facilitator 60 facilitates performing a task associated with the task selection and at least one recognized object in the image. The task facilitator 60 either may facilitate a task for a single recognized object, or may facilitate a respective task for each of a plurality of recognized objects.

Each task may be at least partially facilitated using an associated resource of the computer network 42. For example, one of the tasks in the task menu may be facilitated for the at least one object 14 using a computer network resource 61.

The task facilitator 60 may translate a combination of a recognized object and a task selection to an associated computer address of the associated resource. The task facilitator 60 may comprise either a database or an associative memory which associates a respective computer address to each of a plurality of different object/task selection combinations. Examples of each computer address include, but are not limited to, a URL, a uniform resource name (URN), a uniform resource identifier (URI) and an Internet protocol (IP) address. Potential computer network addresses include all of those available via the World Wide Web.

Optionally, the server system 40 provides an optical code detector 62 capable of detecting and decoding an optical code in a received image. In this case, the task facilitator 60 is responsive to the optical code detector 62 to facilitate a task based on an optical code/task selection combination. Examples of the optical code include one-dimensional and two-dimensional bar codes. The optical code may comprise a product code such as either a UPC bar code, an EAN (European Article Numbering) bar code, a JAN (Japanese Article Numbering) bar code or ISBN (International Standard Book Number) bar code. The task facilitator 60 may comprise either a database or an associative memory which associates a respective computer address to each of a plurality of different optical code/task selection combinations. Potential computer addresses resources include all of those available via the World Wide Web.

Optionally, the task facilitator 60 also associates a respective software agent with each object/task selection combination and each optical code/task selection combination. Each software agent is usable to assist in performing an associated task. Alternatively, the computer network resource associated with a combination may provide a software agent.

Using the aforementioned components, the server system 40 may facilitate the task as follows. The server system 40 receives the task selection and the at least part of the image via the computer network 42. As used herein, the phrase "received image" is meant to indicate either an entire image or the user-selected portion(s) of the entire image received by the server system 40. In other words, if an image is received along with data indicating the user-selected portion(s) of the image, the "received image" indicates the user-selected portion(s) of the image.

The optional optical code detector 62 serves to determine if an optical code is present in the received image. If so, the task facilitator 60 determines one or more computer addresses associated with one or more combinations of the task selection with one or more optical codes detected in the received image.

The object recognizer 56 serves to attempt to recognize one or more objects absent an optical code in the received image. Preferably, the one or more objects absent an optical code are recognized without use of optical character recognition. The task facilitator 60 determines one or more computer addresses associated with one or more combinations of the task selection and one or more objects recognized in the received image.

The server system 40 may communicate each of the computer addresses determined by the task facilitator 60 to the network access apparatus 20. This act may comprise communicating a single computer address either if one optical code is detected in the received image and no objects are recognized in the received image, or if one object is recognized in the received image and no optical codes are detected in the received image. Alternatively, this act may comprise communicating a plurality of computer addresses either if a plurality of optical codes are detected in the received image, if a plurality of objects are recognized in the received image, or at least one optical code is detected in the received image and at least one object is recognized in the received image.

The processor 26 directs the transceiver 44 to receive one or more computer addresses communicated by the server system 40 via the computer network 42. To assist in facilitating a task, the processor 26 directs navigation to a computer network resource using a received computer address. This act may include automatically using a computer address to substantially immediately facilitate computer navigation to a computer network resource. Alternatively, this act may include storing one or more computer addresses to facilitate a subsequent, delayed computer navigation to one or more computer network resources.

The transceiver 44 may send one or more messages to attempt to link to a server which provides the computer network resource, and to request the computer network resource. Further, the transceiver 44 may receive the requested computer network resource in the form of one or more response messages from the server. Media content received from the computer network resource may be processed by the processor 26 based on markup data received from the computer network resource. The processor 26 provides a display signal to the display device 24 to display the marked-up content. The requested computer network resource may be a Web page, for example, having visible content and/or audible content.

Acts performed by the aforementioned components of the server system 40 may be directed by computer-readable content of a computer-readable medium. Examples of the computer-readable medium include a computer-readable storage medium and a computer-readable communication medium. Examples of computer-readable storage media include, but are not limited to, a computer memory, a magnetic floppy disk, a magnetic hard disk, and an optical disk. Examples of computer-readable communication media include, but are not limited to, an electronic medium, an optical medium and an electromagnetic medium. The server system 40 may comprise either a single server computer or a plurality of computers to provide the aforementioned components.

As an alternative to using the server system 40, the image and the task selection may be processed locally by the network access apparatus 20 to facilitate the task. In this case, the processor 26 is programmed to locally perform the herein-described acts of the object recognizer 56, the task facilitator 60, and the optical code detector 62. In this case, the software agents for the tasks may reside in the memory 36. Optionally, the memory 36 comprises a memory card or an alternative medium which is removable from the network access apparatus 20.

Regardless of whether the image and task selection are processed remotely or locally, the associated task associated with the object may be stored as either a custom or a personalized task for future re-use or repetition. Some customized or personalized task options may be shared to other users via the server system 40. An option may be provided to define and/or configure new task options by either the user or a service provider. New task options may be made available immediately or delayed for later use.

Flow of the method may be redirected back to block 10, wherein either an image of another scene is captured and processed based on a task selection, or the same image is processed based on a different task selection, to perform one or more other tasks (not specifically illustrated).

Figure 3:
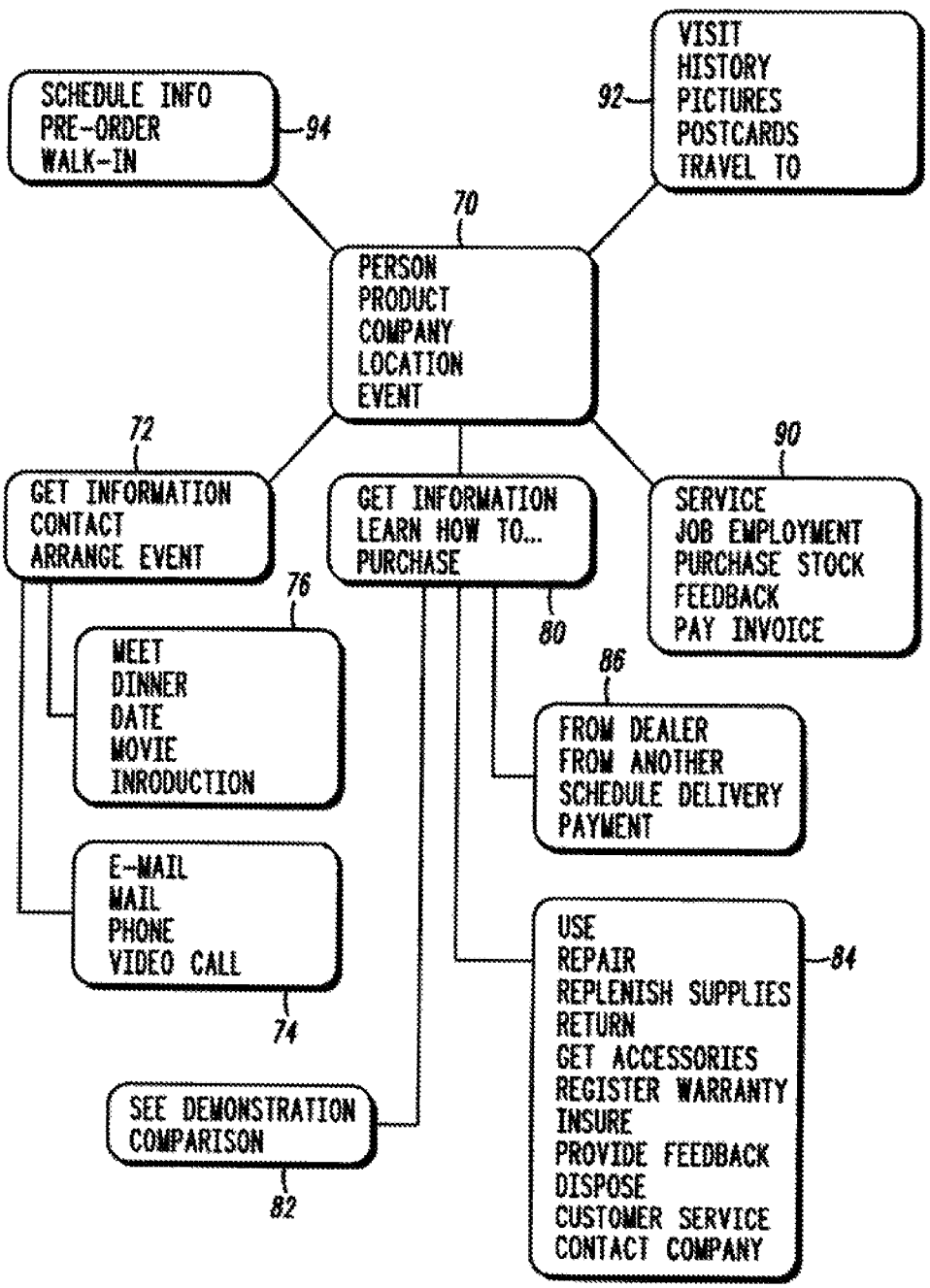
FIG. 3 illustrates an embodiment of a hierarchy of object class and task menus.

FIG. 3 illustrates an embodiment of a hierarchy of object class and task menus. An object class menu 70 comprises a person class, a product class, a company class, a location class and an event class.

The person class is used to perform a task associated with at least one person in the image. The person class may be selected if the image comprises a human face, for example.

The product class is used to perform a task associated with at least one product in the image. The product may be in a visually recognizable package and/or container, the product itself may be visually-recognizable, or the product may have a visually-decodable optical code.

The company class is used to perform a task associated with a company, wherein at least one object in the image is associated with the company. The image may comprise a product either manufactured or sold by the company, a building which houses the company, or a company logo, for example.

The location class is used to perform a task associated with a location, wherein at least one object in the image is associated with the location. The image may comprise a landmark (e.g. Eiffel tower or Statue of Liberty), or a building at the location, for example.

The event class is used to perform a task associated with an event, wherein the at least one object in the image is associated with the event. The image may comprise an amusement park, a theme park, a stadium, an arena, a theater or another event venue, for example.

In response to a selection of the person class from the object class menu 70, a task menu 72 is provided. The task menu 72 provides a first option to get information about a person, a second option to contact a person and a third option to arrange an event with a person. In response to a selection of the second option, a task menu 74 is provided. The task menu 74 provides an option to send an e-mail to the person, an option to send physical mail to the person, an option to place a telephone call to the person, and an option to place a video call to the person. In response to a selection of the third option, a task menu 76 is provided. The task menu 76 provides an option to arrange a meeting with the person, an option to arrange dinner or another meal with the person, an option to arrange a date with the person, an option to arrange seeing a movie or attending another event with the person, and an option to be introduced to the person.

In response to a selection of the product class from the object class menu 70, a task menu 80 is provided. The task menu 80 provides a first option to get information about a product, a second option to learn how to perform various tasks associated with a product, and a third option to purchase the product. In response to a selection of the first option, a task menu 82 is provided. The task menu 82 provides an option to view a demonstration of the product and an option to view a set of features of the product and comparable products.

In response to a selection of the second option, a task menu 84 is provided. The task menu 84 provides an option to learn how to use the product, an option to learn how to repair the product, an option to replenish a supply for the product, an option to return the product, an option to order an accessory for the product, an option to register a warranty for the product, an option to insure the product, an option of provide feedback for the product, an option to dispose the product, an option to contact customer service for the product and an option to contact a manufacturer of the product.

In response to a selection of the third option, a task menu 86 is provided. The task menu 86 provides an option to purchase the product from a dealer, an option to purchase the product from another source, an option to schedule delivery of the product being purchased, and an option to arrange payment for the product being purchased. Other options may include purchasing the product either as-is, with a discount, as a part of a service such as one available at www.mercator.com, or as part of an aggregate ordering service such as those described in any of the above-identified related applications.

In response to a selection of the company class from the object class menu 70, a task menu 90 is provided. The task menu 90 provides an option to schedule service from a company, an option to get job employment information for a company, an option to purchase stock in a company, an option to provide feedback to a company and an option to pay an invoice to a company. Each of the above tasks may be performed based on an image of an object associated with the company.

In response to a selection of the location class from the object class menu 70, a task menu 92 is provided. The task menu 92 provides an option to arrange a visit to a location, an option to get historical information about a location, an option to get at least one picture of a location, an option to get a postcard of a location and an option to get travel information to a location.

In response to a selection of the event class from the object class menu 70, a task menu 94 is provided. The task menu 94 provides an option to obtain information associated with an event and an option to order a ticket to an event. Information associated with an event may include scheduling information, food information, transportation information, and/or rides information (e.g. at an amusement or theme park), for example. Various options to order a ticket include pre-ordering a ticket for a later date (which may be discounted), or ordering a walk-in ticket for the same day (which may be regularly-priced). Another example of an event class task includes making reservations at a restaurant.

Figure 4:
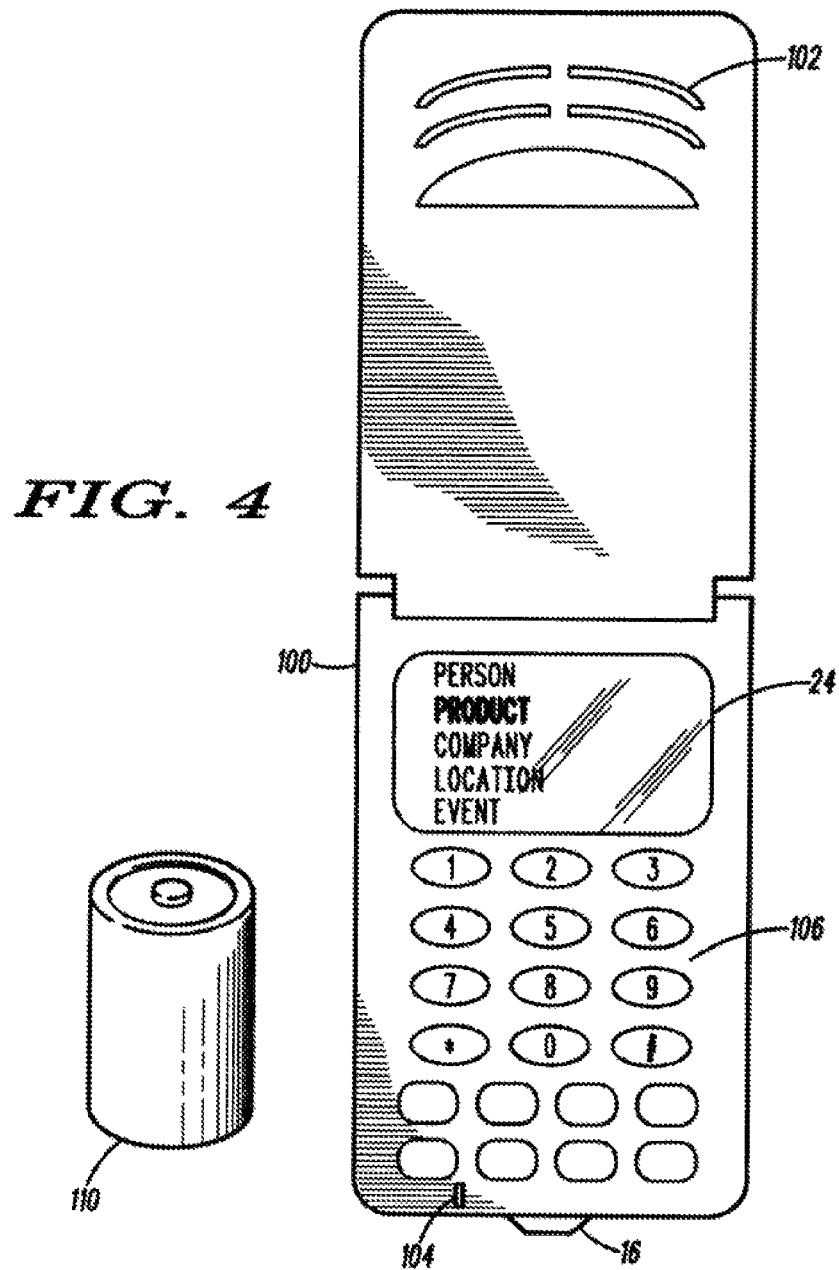
FIG. 4 illustrates an embodiment of a network access apparatus providing an object class menu.

FIG. 4 illustrates an embodiment of the network access apparatus 20. In this embodiment, the network access apparatus 20 comprises a wireless telephone 100 comprising a speaker 102 and a microphone 104. The display device 24 comprises a liquid crystal display on the wireless telephone 100. The user input interface 32 comprises a telephone keypad 106 and any additional buttons (not specifically illustrated) on the wireless telephone 100.

The digital camera 16 is accessible either at an end of the wireless telephone 100 as illustrated, or at an alternative portion of the wireless telephone 100. For purposes of illustration an example, consider the digital camera 16 capturing an image of a depleted battery 110 which the end user wishes to dispose.

After capturing the image, the display device 24 provides the object class menu 70. The end user selects the product class from the object class menu 70 using one or buttons on the wireless telephone 100.

Figure 5:
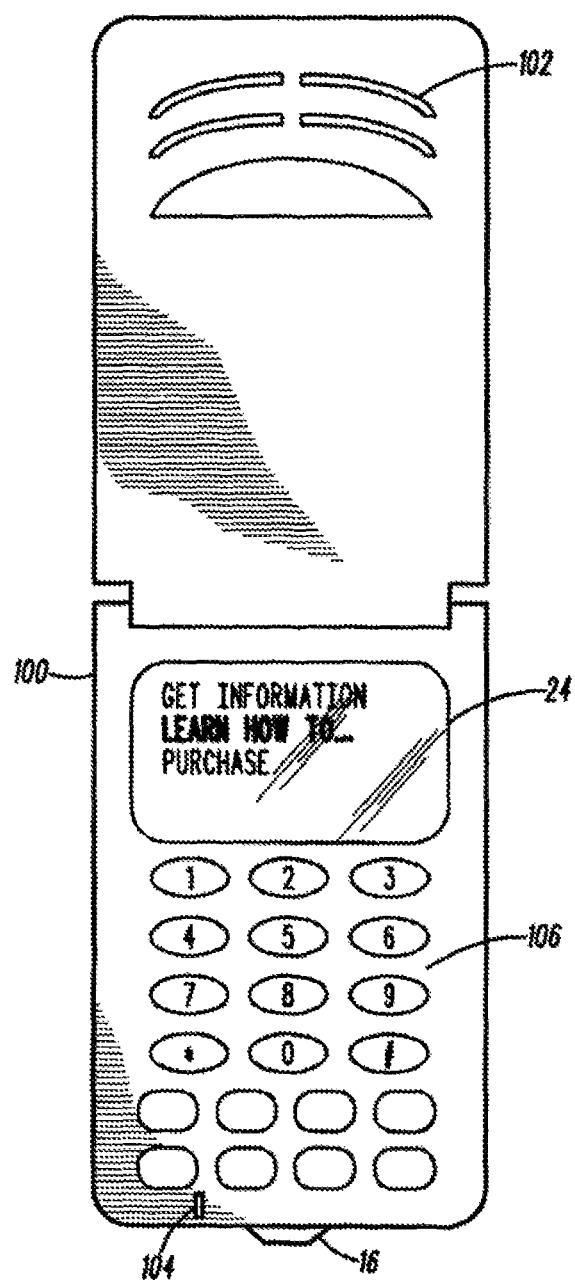
FIG. 5 illustrates an embodiment of the network access apparatus providing a first task menu for a product class.

In response to selecting the product class, the display device 24 provides the task menu 80 as shown in FIG. 5. From the task menu 80, the end user selects the "learn how to . . . " option using one or more buttons on the wireless telephone 100.

Figure 6:
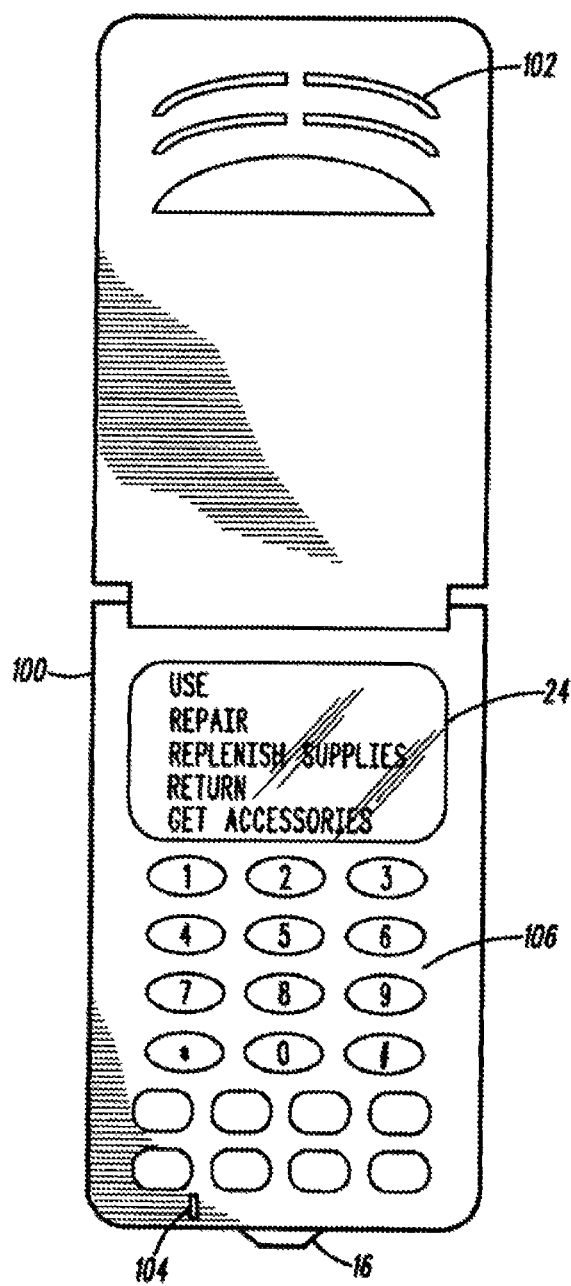
FIG. 6 illustrates an embodiment of the network access apparatus providing a portion of a second task menu based on a selection from the first task menu.
Figure 7:
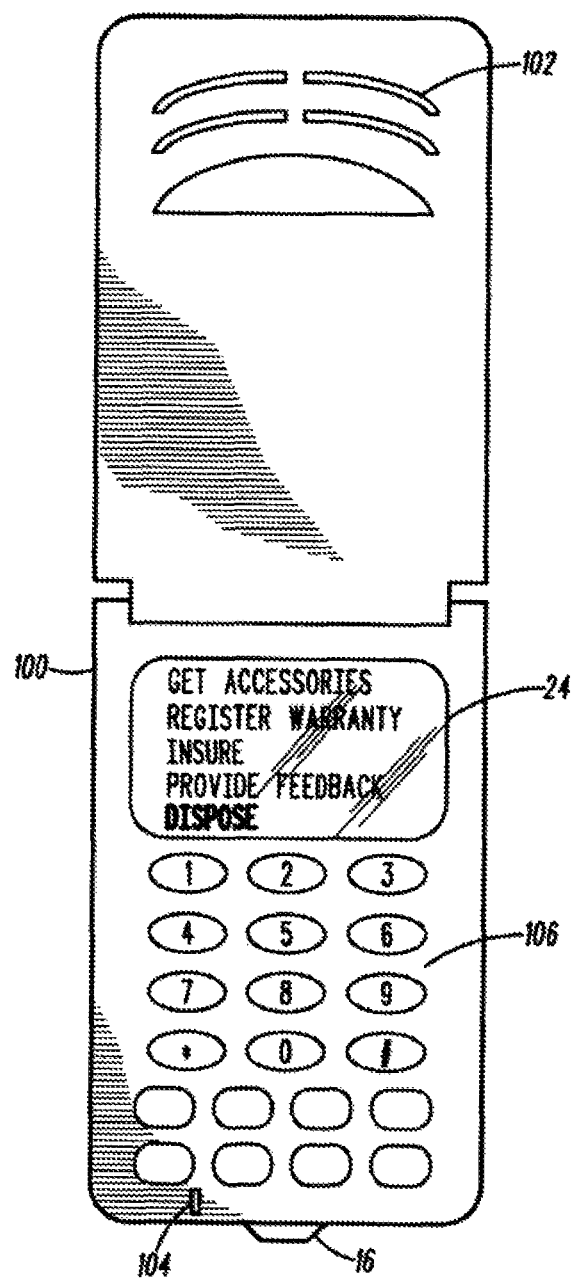
FIG. 7 illustrates an embodiment of the network access apparatus providing another portion of the second task menu.
Figure 8:
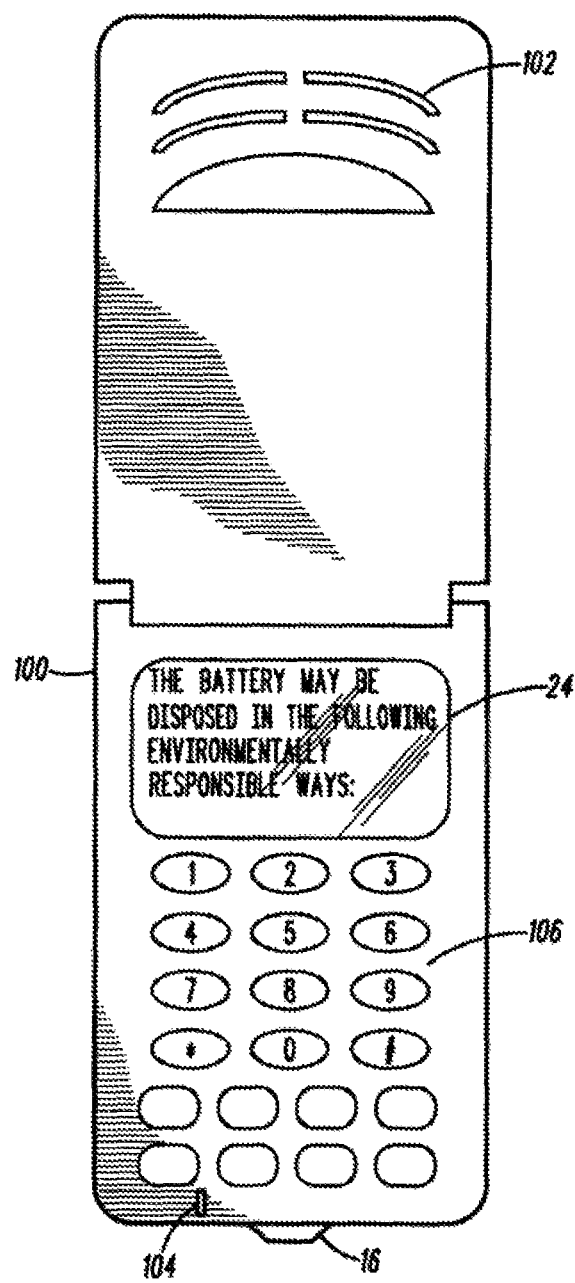
FIG. 8 illustrates an embodiment of the network access apparatus providing information based on a selection from the second task menu.

In response to selecting the "learn how to . . . " option, the display device 24 provides a portion of the task menu 84 as shown in FIG. 6. Since the dispose task option is not displayed in the portion of the task menu 84, the end user uses one or more buttons on the wireless telephone 100 to scroll down to another portion of the task menu 84, as shown in FIG. 7. The end user selects the "dispose" task option using one or more buttons on the wireless telephone 100. In response thereto, the wireless telephone 100 receives battery disposal information from a computer network resource (e.g. the computer network resource 61 in FIG. 2). The battery disposal information is displayed by the display device 24, as shown in FIG. 8. After reading the battery disposal information, the end user could schedule removal of the battery by navigating to an associated task option using the wireless telephone 100.

Thus, there have been described herein several embodiments including a preferred embodiment of method and system for facilitating tasks using images and selections from object class and task menus.

It will be apparent to those skilled in the art that the disclosed invention may be modified in numerous ways and may assume many embodiments other than the preferred form specifically set out and described above. For example, some of the acts described with reference to FIG. 1 may be performed either concurrently or in an alternative order.

Accordingly, it is intended by the appended claims to cover all modifications of the invention which fall within the true spirit and scope of the invention.

What is claimed is:

1. A method for use with a wireless communication device capable of accessing a computer network, the method comprising:
receiving at a wireless communication device and via the computer network, a sequence of images of an event, at least one image of the sequence of images including a product;
displaying an object class menu that includes at least two of: a person class, a product class, an event class, a location class and a company class;
displaying a task menu including a plurality of tasks that are based on user selection of the product class;
receiving via a server system, selection of a task option from the plurality of tasks, the task option including retrieving product information; and
facilitating the task via communication with the computer network and based on the recognition of the product in the at least one image via the server system, wherein facilitating the task includes retrieving product information for the product.

2. The method of claim 1 wherein facilitating the task further includes: retrieving purchase information relating to the product.

3. The method of claim 1 wherein facilitating the task further includes: retrieving product delivery information relating to the product.

4. The method of claim 3 wherein facilitating the task further includes: displaying the product information, and the product delivery information on the wireless communication device.

5. The method of claim 1 wherein facilitating the task further includes: facilitating the purchase of the product via the wireless communication device.

6. The method of claim 1 wherein at least one task option is configured as a customized task.

7. The method of claim 6 wherein the customized task is shared by other users of other wireless communication devices via a server system.

8. The method of claim 1 wherein the plurality of tasks include previously added task options made available from a service provider.

9. A method for use with a wireless communication device capable of accessing a computer network, the method comprising:
receiving at a wireless communication device and via the computer network, a sequence of images of an event, at least one image of the sequence of images including an object associated with a company;
displaying an object class menu that includes at least two of: a person class, a product class, an event class, a location class and a company class;
displaying a task menu including a plurality of tasks that are based on user selection of the company class;
receiving via a server system, selection of a task option from the plurality of tasks, the task option including providing feedback to the company; and
facilitating the task via communication with the computer network and based on the recognition of the object associated with the company in the at least one image via the server system, wherein facilitating the task includes providing feedback to the company.

10. The method of claim 9 wherein facilitating the task includes sending an email.

11. The method of claim 9 wherein facilitating the task includes retrieving employment information.

12. The method of claim 9 wherein facilitating the task includes scheduling service from the company.

13. The method of claim 9 wherein facilitating the task includes purchasing stock of the company.

14. The method of claim 9 wherein facilitating the task includes facilitating payment of an invoice of the company.

15. The method of claim 9 wherein at least one task option is configured as a customized task.

16. The method of claim 15 wherein the customized task is shared by other users of other wireless communication devices via a server system.

17. The method of claim 9 wherein the plurality of tasks include previously added task options made available from a service provider.

* * * * *